(12) United States Patent
Johnson

(10) Patent No.: US 7,448,844 B1
(45) Date of Patent: Nov. 11, 2008

(54) BLISK HAVING PARTIALLY CUT BLADE ATTACHMENT

(75) Inventor: Gabriel L Johnson, Port St. Lucie, FL (US)

(73) Assignee: Florida Turbine Technologies, Inc., Jupiter, FL (US)

(*) Notice: Subject to any disclaimer, the term of this patent is extended or adjusted under 35 U.S.C. 154(b) by 496 days.

(21) Appl. No.: 11/356,950

(22) Filed: Feb. 18, 2006

Related U.S. Application Data

(60) Provisional application No. 60/708,716, filed on Aug. 16, 2005.

(51) Int. Cl.
*F03B 3/12* (2006.01)

(52) U.S. Cl. .............. 415/9; 416/2; 416/234; 29/889.1; 29/889.23; 29/402.08

(58) Field of Classification Search ........ 416/2, 416/219 R, 220 R, 234, 244 A, 248, 239; 29/402.03, 402.05–402.09, 402.11–402.14, 29/889.1, 889.23, 889.21, 889.22; 415/9
See application file for complete search history.

(56) References Cited

U.S. PATENT DOCUMENTS

| | | | |
|---|---|---|---|
| 2,380,276 A * | 7/1945 | Warren ................. 416/213 R |
| 3,003,745 A * | 10/1961 | Ferguson, Jr. et al. .......... 415/9 |
| 4,135,857 A | 1/1979 | Pannone et al. |
| 5,755,031 A | 5/1998 | Baumgarten et al. |
| 6,095,402 A | 8/2000 | Brownell et al. |
| 6,106,233 A | 8/2000 | Walker et al. |
| 6,375,423 B1 * | 4/2002 | Roberts et al. ............... 416/2 |
| 6,471,485 B1 | 10/2002 | Rossmann et al. |
| 6,478,545 B2 | 11/2002 | Crall et al. |
| 6,494,683 B1 | 12/2002 | Nolan et al. |
| 7,399,159 B2 * | 7/2008 | Matheny et al. ............. 416/62 |

\* cited by examiner

*Primary Examiner*—Edward Look
*Assistant Examiner*—Aaron R Eastman
(74) *Attorney, Agent, or Firm*—John Ryznic

(57) ABSTRACT

An integrally bladed rotor disk, commonly referred to as an IBR or a blisk, includes partial cuts in the rotor disk extending from the rotor disk surface and along side the blades to form a partial root portion below each blade. A damaged blade can be removed from the rotor disk by breaking off the partial root portion from the disk or additionally cutting the disk to join the two cuts forming the partial root portion of the damaged blade. A replacement blade having a root already formed on the blade can then be inserted into the remaining slot of the rotor disk and secured to the rotor disk by any known means. The partial formed root of the blade can be in the shape of a dove tail root or a fir tree root.

9 Claims, 3 Drawing Sheets

BLISK HAVING PARTIALLY CUT BLADE ATTACHMENT

CROSS-REFERENCE TO RELATED APPLICATIONS

This application claims the benefit to an earlier filed Provisional Application No. 60/708,716 filed on Aug. 16, 2005 entitled BLISK HAVING PARTIALLY CUT BLADE ATTACHMENT.

STATEMENT REGARDING FEDERALLY SPONSORED RESEARCH OR DEVELOPMENT

None.

BACKGROUND OF THE INVENTION

1. Field of the Invention

The present invention relates to an integrally bladed rotor disk, commonly referred to as an IBR or a blisk, and more specifically to structure of the blisk and a method of replacing a damaged blade on the blisk.

2. Description of the Related Art Including Information Disclosed Under 37 CFR 1.97 and 1.98

An integrally bladed rotor disk, or IBR or blisk, is a one piece bladed disk that has the blades formed into the disk. Blisk are usually cast or machined as a single piece, and therefore they are a low cost bladed disk as opposed to disks having dove tail slots to slide individual blades therein. One problem with turbomachinery is damage to a blade. If a single blade on a blisk is damaged beyond repair, the entire blisk is useless. If the damaged blade can be repaired, the repair is usually costly and time consuming due to welding, machining, and other metal repair procedures. Therefore, there is a need in the art of integrally bladed rotors (or, blisks) to provide for a more efficient and less costly way to repair a damaged blade.

BRIEF SUMMARY OF THE INVENTION

An integrally bladed rotor disk (also known as an IBR or blisk) having a plurality of blades extending from the rotor disk, where each blade has a typical dovetail root partially cut out from the rotor disk to form the sides of the dovetail. The partially formed dovetail root for each blade makes it easy to remove a damaged blade by completing a cut in order to completely remove the damaged blade, or the damaged blade can by broken off from the remaining metal connection to the rotor disk by pounding the damaged blade. With a damaged blade removed and a slot remaining in the rotor disk from the removed blade, a replacement blade that has a dovetail root formed on the blade can be secured in the dovetail slot of the rotor disk and secured under any of the known methods for slotted blades.

DETAILED DESCRIPTION OF THE INVENTION

Figure 1:
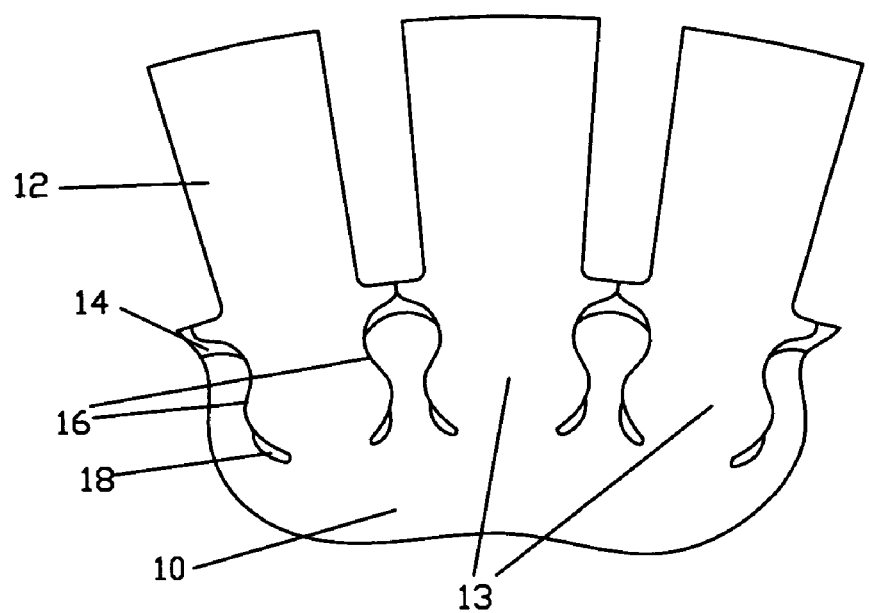
FIG. 1 shows a front view of a blisk of the present invention with the cutouts formed between adjacent blades.

An integrally bladed rotor (or, blisk) of the present invention is shown in FIGS. 1 through 4. An IBR (or, blisk) has a well known meaning in the art of turbomachinery. And that meaning is a bladed rotor disk in which the rotor and all the blades that extend from the rotor are formed as a single solid piece instead of a plurality of individual blades secured to the rotor disk by some attachment means. FIG. 1 shows the Blisk to include the rotor disk 10, and a plurality of blades 12 extending from the disk 10. Side cuts 16 are made in the blisk in a location and in a shape to simulate a fir tree or dovetail slot in the disk, except the side cuts 16 are not joined to form a complete slot. The side cuts 16 extend into the outer surface of the disk 10 at a location between adjacent blades 12 and form a partial root portion 13 for each blade. Additional cuts 24 are made joining the dove tail side cuts 16 to form a cavity 14 and 18 in the disk 10. The partial root of the blade is therefore defined to be two side cuts 16 extending on both sides of the blade 12 and without the additional cut 24. Cavity 14 is of such size that a friction damping element can be inserted into the space to promote damping of the blades. The size and shape of the side cuts 16 and the cavities 14 and 18 can vary depending upon the size of the rotor disk and the blades 12. The cuts in the rotor disk that form the partial root and openings can be performed by the well known electrical discharge machining (EDM) process or a wire EDM process.

With the damaged blade removed, especially if the blade is broken off of the rotor disk, additional machining or grinding of the slot surface may be needed in order that the replacement blade with an existing root will fit within the remaining slot. If the wire EDM process is used to form the cuts, the EDM process can be used to join two adjacent cuts to cut the blade from the rotor disk and form the slot without the need for additional machining or grinding of the remaining slot.

Figure 5:
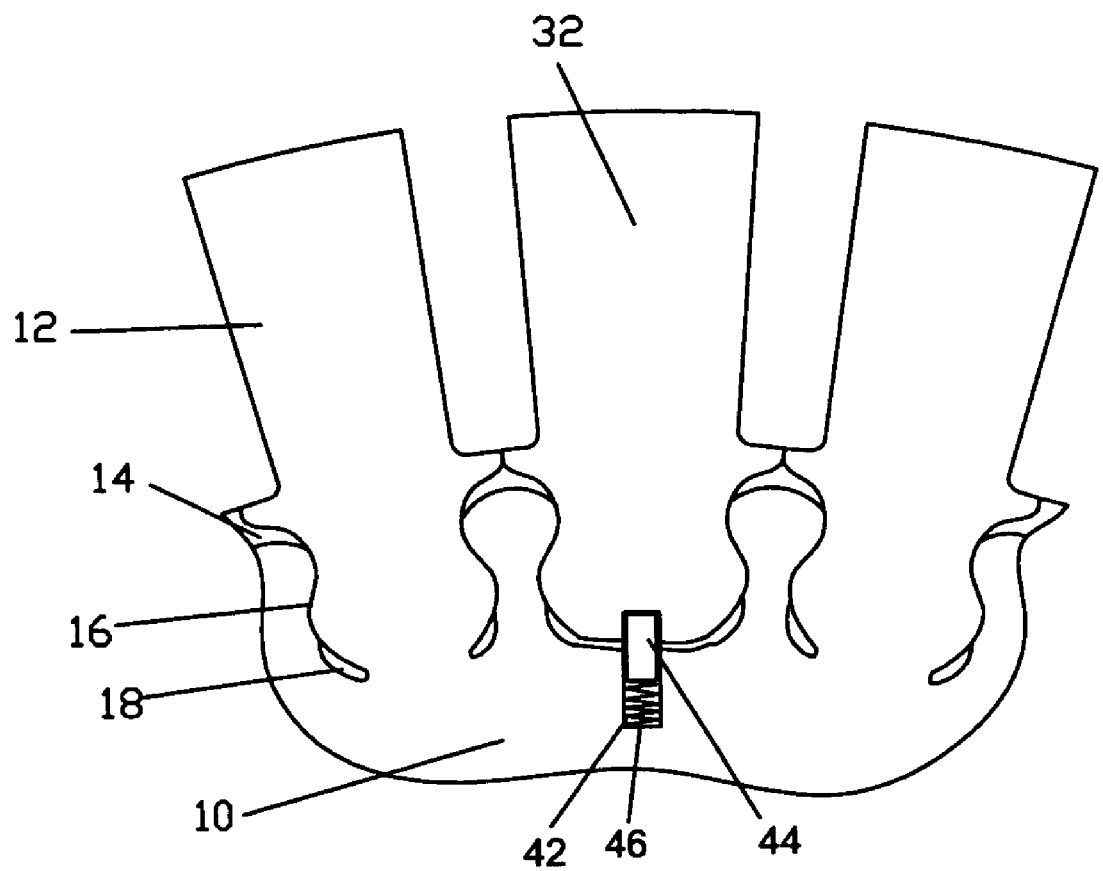
FIG. 5 shows a front view of the blisk of FIG. 4 with the replacement blade and root held within the slot by a spring biased pin.

The dovetail formed in the blade of FIG. 1 has one surface on each side of the root that acts to prevent radial displacement of the blade out of the slot. In a fir tree shaped root, a plurality of surfaces will be formed on each side of the root to prevent this radial displacement of the blade out of the slot. Other forms of securing a blade root into a slot are envisioned. A blade root can include a hole in which a pin extends through and into a hole in the rotor disk can be used to hold the blade and root within the rotor disk as seen in FIG. 5. The hole extends in a radial direction away from the center of rotation of the rotor disk and into the blade root from the bottom. A pin is used to prevent the blade root from slipping out of the slot. The pin is biased in a radial direction away from the center of rotation of the rotor disk. The pin is pushed against the bias of the spring in order to slide the blade into the slot. The pin will be biased into the hole of the root when the blade is properly aligned in the slot. When a damaged blade is removed and the bottom of the slot is machined to fit the new blade and root, the hole can be drilled in the root bottom such that it will be aligned with a hole in the replacement blade which has its hole formed or drilled therein before insertion into the rotor disk.

Other means to prevent the blade from sliding out of the slot would be to solder a metal blade root to the slot in a metal rotor disk, or to use a glue or resinous compound if the blade and rotor disk are made of a plastic material.

Figure 2:
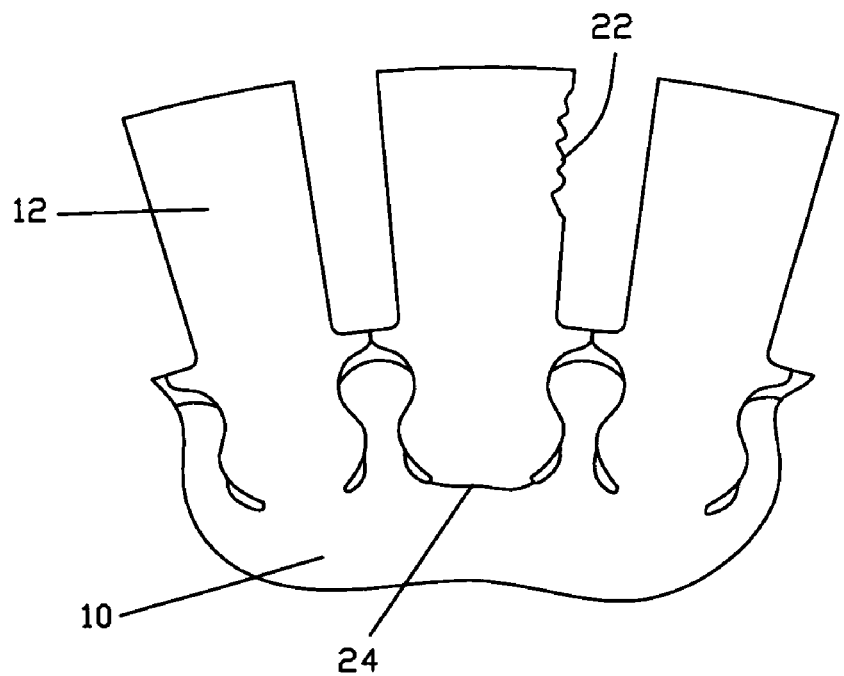
FIG. 2 shows a front view of the blisk of FIG. 1 in which the middle blade includes damage and the cuts on the sides of the damaged blade are connected by an additional cut.
Figure 3:
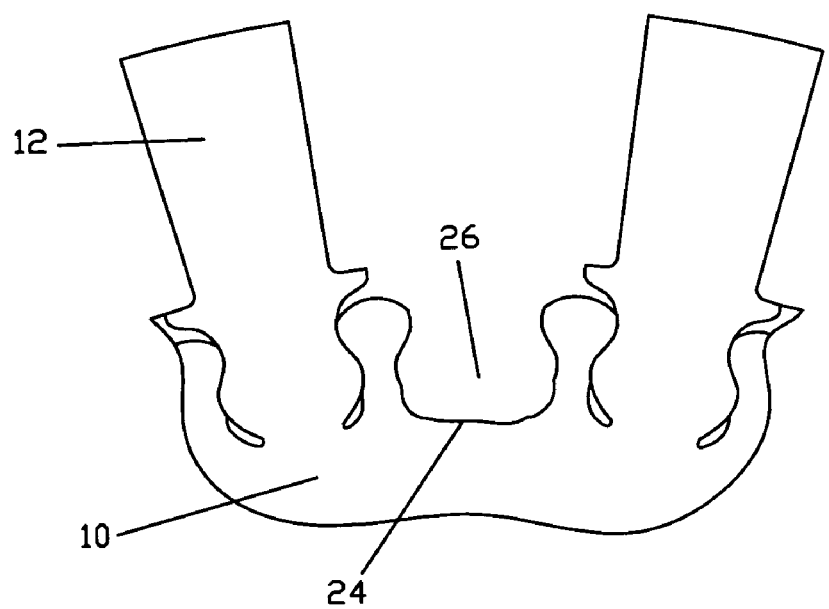
FIG. 3 shows a front view of the blisk of FIG. 2 with the damaged disk removed and the remaining fir tree slot formed in the blisk.
Figure 4:
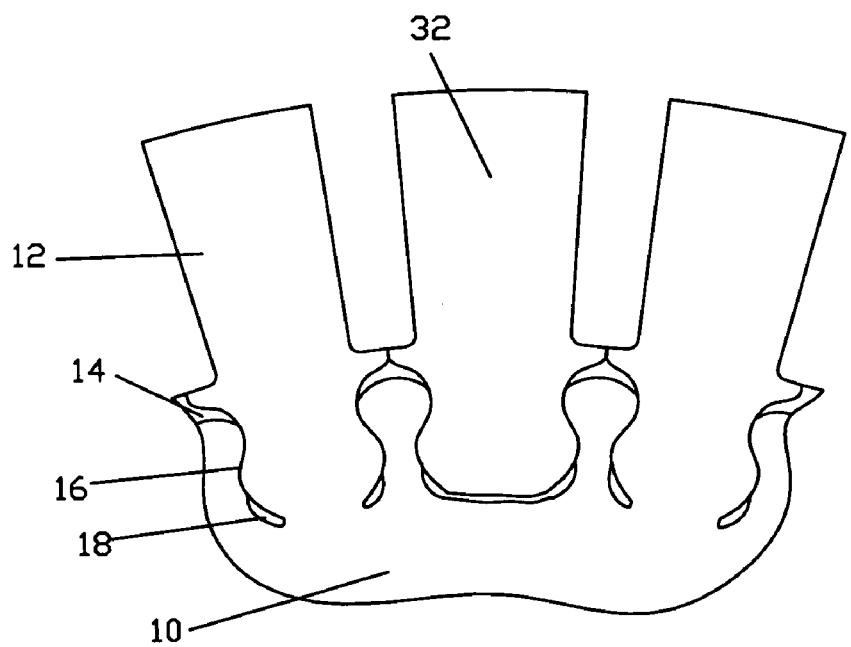
FIG. 4 shows a front view of the blisk of FIG. 3 with a replacement blade inserted into the fir tree slot.

FIG. 2 shows a Blisk having a damaged blade 22. In the present invention, an additional cut 24 is made to join adjacent side cuts 16 just beneath the damaged blade 22. The damaged blade 22 can be easily removed because of the additional cut 24, resulting in a well known dove tail or fir tree shaped slot 26 as shown in FIG. 3. The damaged blade 22 can be removed by simply sliding the damaged blade 22 out the slot as in the prior art slotted disks. With the damaged blade 22 removed and the resulting dove tail shaped slot 26 in its place, a replacement blade 32 can be inserted into the slot 26 as shown in FIG. 4. The replacement blade 32 will have a root 33 with a similar dove tail or fir tree shape as that of the slot 26 in which the root will be secured. The size and shape of the fir tree slot used in the present invention can be any of the well known fir tree slots used in the turbomachinery art. The purpose of the slot in the present invention is to provide a means to secure the replacement blade 32 into the slot when the damaged blade 22 is removed.

The side cuts 16 can be formed to extend even closer to each other than shown in FIG. 1 such that the damaged blade 22 can be removed by breaking the blade and root off of the blisk without the need to provide an additional cut 24 as discussed in the above embodiment. An operator could use a hammer to break the remaining material to form the additional cut 24 in order to remove the damaged blade 22. The resulting surface on the disk 10 could then be machined if required to form the slot 26 required to fit the replacement blade 32.

The present invention is disclosed as a metal blisk. However, a blisk made of any well known material such as plastic or ceramic could be used with the features of the present invention. A plastic blisk could have the side cuts 16 also formed therein to allow for easy removal of a damaged plastic blade, and the insertion of the replacement blade.

An added feature of the present invention is the damping capability provided by the side cuts 16 and the cavities 14 and 18.

The invention claimed is:

1. A blisk, the blisk having a plurality of rotor blades extending from an outer disk surface, the improvement comprising:

the blisk includes two cuts extending from the outer disk surface and below each blade to form a partial root for each blade such that a damaged blade can be removed from the blisk to leave a slot for insertion of a new blade.

2. The blisk of claim 1, and further comprising:
the partial root forms a dovetail shape root of the blade.

3. The blisk of claim 1, and further comprising:
the partial root forms a fir tree shape root of the blade.

4. The blisk of claim 1, and further comprising:
the two cuts are symmetrically located on the sides of a radial axis of the blade.

5. A method of repairing a damaged blade on a blisk the method comprising the steps of:

providing for a plurality of cuts in the blisk to form a partial root portion for each of the blades;

removing a damaged blade by connecting the two cuts that form the partial root portion of the damaged blade;

removing the damaged blade from the resulting slot; and, installing a new blade into the resulting slot, the new blade having a root portion with substantially the same shape as the resulting slot formed in the blisk.

6. The method of repairing a damaged blade on a blisk of claim 5, and further comprising the step of:

forming the partial root portion for a blade with a dove tail slot shape.

7. The method of repairing a damaged blade on a blisk of claim 5, and further comprising the step of:

forming the partial root portion for a blade with a fir tree slot shape.

8. The method of repairing a damaged blade on a blisk of claim 5, and further comprising the step of:

where the step of removing the damaged blade includes the step of breaking off the blade from the blisk.

9. The method of repairing a damaged blade on a blisk of claim 5, and further comprising the step of:

where the step of removing the damaged blade includes the step of joining the cuts that form the partial root portion by cutting the blisk to form a completed root portion and a remaining slot in the blisk.

* * * * *